(12) United States Patent
Lahary et al.

(10) Patent No.: US 10,023,471 B2
(45) Date of Patent: Jul. 17, 2018

(54) PRECIPITATED SILICA AND PAPER INDUSTRY/OTHER APPLICATIONS THEREOF

(71) Applicant: RHODIA OPERATIONS, Aubervilliers (FR)

(72) Inventors: Pierre-Yves Lahary, Lyons (FR); Yvonick Chevallier, Speracedes (FR); Remi Valero, Saint Jean de Thurigneux (FR)

(73) Assignee: Rhodia Operations, Aubervilliers (FR)

( * ) Notice: Subject to any disclaimer, the term of this patent is extended or adjusted under 35 U.S.C. 154(b) by 0 days.

(21) Appl. No.: 14/510,952

(22) Filed: Oct. 9, 2014

(65) Prior Publication Data
US 2015/0132577 A1    May 14, 2015

Related U.S. Application Data

(63) Continuation of application No. 12/306,654, filed as application No. PCT/EP2007/056402 on Jun. 27, 2007, now abandoned.

(30) Foreign Application Priority Data

Jun. 27, 2006  (FR) ..................... 06 05763

(51) Int. Cl.
| | | |
|---|---|---|
| C01B 33/12 | (2006.01) | |
| D21H 19/40 | (2006.01) | |
| C01B 33/187 | (2006.01) | |
| C01B 33/141 | (2006.01) | |
| C01B 33/193 | (2006.01) | |
| B41M 5/52 | (2006.01) | |

(52) U.S. Cl.
CPC .......... *C01B 33/12* (2013.01); *C01B 33/1417* (2013.01); *C01B 33/187* (2013.01); *C01B 33/193* (2013.01); *D21H 19/40* (2013.01); *B41M 5/5218* (2013.01); *Y10T 428/2982* (2015.01)

(58) Field of Classification Search
CPC ........ C01B 33/12; C01B 33/187; D21H 19/40
See application file for complete search history.

(56) References Cited

U.S. PATENT DOCUMENTS

| | | | |
|---|---|---|---|
| 4,336,245 A | 6/1982 | Wason | |
| 4,992,251 A | 2/1991 | Aldcroft et al. | |
| 5,614,177 A | 3/1997 | Persello | |
| 5,968,470 A | 10/1999 | Persello | |
| 6,663,963 B2 | 12/2003 | Preston et al. | |
| 2005/0032965 A1* | 2/2005 | Valero ............... | A61K 8/25 524/493 |
| 2005/0047985 A1* | 3/2005 | Mori .................. | C01B 33/1585 423/335 |
| 2006/0100344 A1 | 5/2006 | Stenzel et al. | |

FOREIGN PATENT DOCUMENTS

| | | |
|---|---|---|
| EP | 0552065 A | 7/1993 |
| JP | 01156594 A | 6/1989 |
| WO | 2004/014795 A1 | 2/2004 |

OTHER PUBLICATIONS

International Search Report dated Sep. 26, 2007, corresponding to International Patent Application No. PCT/EP2007/056402.

* cited by examiner

*Primary Examiner* — Shuangyi Abu Ali
(74) *Attorney, Agent, or Firm* — Osha Liang LLP

(57) ABSTRACT

Precipitated silica specifically useful in the paper industry and in particular in paper-coating applications for inject printing, is characterized by an uptake of DOP oil lower than 260 ml/100 g, a pore volume ($V_{d25}$) of greater than 0.8 ml/g formed by pores having a diameter of less than 25 nm, a CTAB specific surface area of greater than 280 m²/g.

22 Claims, No Drawings

PRECIPITATED SILICA AND PAPER INDUSTRY/OTHER APPLICATIONS THEREOF

CROSS-REFERENCE TO EARLIER APPLICATIONS

This application is a continuation of application Ser. No. 12/306,654, filed Dec. 1, 2009, which is a national phase of PCT/EP 2007/056402, filed Jun. 27, 2007 and designating the United States (published in the French language on Jan. 3, 2008, as WO 2008/000761 A1; the title and abstract were also published in English), which claims priority under 35 U.S.C. § 119 of FR 0605763, filed Jun. 27, 2006, each hereby expressly incorporated by reference in its entirety and each assigned to the assignee hereof.

The present invention relates to particular precipitated silicas, having notably a specific porosity.

It also relates to the method for the preparation thereof.

It also relates to the uses thereof, preferably in the paper industry, especially as paper fillers, in particular in paper-coating applications for inkjet printing.

It is known that certain silicas can be used in the manufacture of paper, either as bulk filler for ordinary paper of newsprint type or as coating filler for special paper demanding a higher surface quality, such as, for example, papers for color inkjet printers.

Incorporated in the body of the paper, silicas can make it possible to improve one or more of the following properties : opacity, whiteness, density, porosity, mechanical properties, printability, etc.

Certain types of paper, in particular those referred to as special paper, must also have a high surface quality.

This is in particular the case with paper for color inkjet printers, of which high-definition color reproduction is demanded. This surface condition can then be obtained by coating the paper sheets with a silica-based coating slip.

Even though the silicas developed to date are suitable in certain respects for application in papermaking, they may, however, also have certain drawbacks, in particular for coating paper for color inkjet printers.

The principal object of the invention is to provide a silica which is an alternative to the known silicas and which has good properties in terms of paper applications, in particular for coating paper for inkjet printing.

Thus, a subject of the present invention is in particular a precipitated silica characterized in that it has:
  an uptake of DOP oil of less than 260 ml/100 g,
  a porous volume ($V_{d25}$) of greater than 0.8 ml/g, formed by pores with a diameter of less than 25 nm,
  a CTAB specific surface area of greater than 280 m²/g.

In the subsequent disclosure, the uptake of DOP oil is determined according to standard ISO 787/5 using dioctyl phthalate (the measurement is carried out on the product per se (undried)).

The porous volume ($V_{d25}$) and the pore size are determined by the Barett, Joyner and Halenda method, known as BJH method, described in particular by F. Rouquerol, L. Luciani, P. Llewwellyn, R. Denoyel and J. Rouquerol, in "Les Techniques de l'Ingénieur", September 2001. In the present disclosure, only pores with a diameter of less than 25 nm are taken into consideration.

The CTAB specific surface area is the external surface area determined according to standard NF T 45007 (November 1987).

The BET specific surface area is determined according to the Brunauer-Emmett-Teller method described in "The Journal of the American Chemical Society", vol. 60, page 309, February 1938 and corresponding to standard NF ISO 9277 (December 1996).

The median particle size (d50), by mass, can be determined by laser diffraction according to standard NF X 11-666. The measurement is carried out using a Malvern Mastersizer 2000 particle sizer (from Malvern Instruments) and its Hydro 2000G suspension sampler, in the presence of ultrasound. During the measurement, the parametering of the sampler is the following: pump adjusted to 1250 rpm, stirrer adjusted to 500 rpm and ultrasonification level adjusted to 20%; the "Fraunhofer" model is selected and the amount of silica introduced into the measuring fluid (demineralized water) is such that the obscuration before the measurement is between 10 and 20%; the duration of the measurement is 20 seconds.

The pH is measured according to standard ISO 787/9 (pH of a suspension containing 5% by weight of silica in deionized water).

The humidity is the residual water content measured according to standard ISO 787/2, after heat treatment at 105° C. for 2 hours.

The precipitated silica according to the invention has a particular porosity.

It has an uptake of DOP oil of less than 260 ml/100 g, preferably less than 240 ml/100 g, in particular less than 225 ml/100 g.

Its uptake of DOP oil may in particular be less than 210 ml/100 g, for example less than 205 ml/100 g.

Its is in general greater than 145 ml/100 g, for example greater than 180 ml/100 g.

It porous volume ($V_{d25}$), formed by pores with a diameter of less than 25 nm, is greater than 0.8 ml/g, preferably greater than 0.9 ml/g, in particular at least 0.95 ml/g.

It may be at least 1.0 ml/g, in particular at least 1.05 ml/g, for example greater than 1.1 ml/g.

It is in general less than 1.7 ml/g, in particular less than 1.5 ml/g.

The silica according to the invention has a CTAB specific surface area of greater than 280 m²/g, preferably greater than 300 m²/g; it may in particular be greater than 330 m²/g, for example greater than 350 m²/g.

It is generally less than 450 m²/g, in particular less than 400 m²/g.

The CTAB specific surface area of the silica according to the invention may be strictly between 330 and 400 m²/g, in particular strictly between 350 and 400 m²/g, for example between 355 and 390 m²/g.

In general, the precipitated silica according to the invention has a BET specific surface area of greater than 450 m²/g, in particular greater than 510 m²/g ; it may in particular be greater than 540 m²/g, for example greater than 650 m²/g, or even than 800 m²/g.

Its BET specific surface area is usually less than 1200 m²/g, in particular less than 1000 m²/g, especially at most 900 m2/g.

Preferably, the porosity of the silica according to the invention is such that the latter has a pore diameter ($d_p$), for pores with a diameter of less than 25 nm, taken at the maximum of the distribution of pore size by volume (mode), of less than 12.0 nm, in particular less than 8.0 nm, especially less than 7.0 nm, for example less than 6.5 nm ; said pore diameter may be less than 5.5 nm, or even less than 3.0 nm.

Its aluminum content is, in general, less than 2800 ppm, in particular less than 1500 ppm, especially less than 1000 ppm. It is preferably less than 500 ppm, for example less than 200 ppm.

The precipitated silica according to the present invention may have a median particle size (d50) of at most 20 μm, preferably between 0.5 and 20 μm, in particular between 2 and 15 μm, especially between 3.5 and 12 μm, for example between 6 and 10.5 μm, or even between 9.5 and 10.5 μm. This is found to be particularly advantageous when it is intended to be used as a coating filler (pigment), for example in a coating slip, for paper, in particular for paper for inkjet printers (black and/or color), especially color inkjet printers.

The silica according to the invention may have, particularly when it is intended for the use indicated above:
- an uptake of DOP oil of less than 205 ml/100 g,
- a porous volume ($V_{d25}$), formed via particles with a diameter of less than 25 nm, of at least 0.95 ml/g, in particular of at least 1.0 ml/g, especially of at least 1.05 ml/g,
- a CTAB specific surface area of strictly between 330 and 400 m²/g, in particular strictly between 350 and 400 m²/g, for example between 355 and 390 m²/g,
- a BET specific surface area of greater than 510 m²/g,
- a pore diameter ($d_p$), for pores with a diameter of less than 25 nm, taken at the maximum of the distribution of pore size by volume (mode), of less than 12.0 nm, in particular less than 8.0 nm,
- a median particle size (d50) of between 6 and 10.5 μm, in particular between 9.5 and 10.5 μm.

In general, the silica according to the invention has a pH of between 2.5 and 8.5, in particular between 2.7 and 8.0.

Its pH is preferably between 2.5 and 6.0, for example between 2.7 and 5.8 or between 2.7 and 4.3. It may also be between 6.0 and 8.5, in particular between 7.0 and 8.0, for example between 7.2 and 7.8.

The humidity of the silica according to the invention may generally be at most 13.0% by weight, in particular at most 11.5% by weight, especially at most 10.5% by weight. It may, for example, be at most 10.0% by weight, or even at most 8.0% by weight, or even less than 6.0% by weight.

The content of soluble salt (or residual anion), expressed as sodium sulfate, of the silica according to the invention may preferably be less than 4.0% by weight, in particular less than 3.5% by weight. It may especially be less than 2.0% by weight, for example less than 1.0% by weight.

The silica according to the invention is usually in powder form.

A subject of the invention is also an aqueous suspension of precipitated silica, characterized in that it comprises at least one precipitated silica according to the invention, as described in the disclosure above.

This suspension may be obtained by suspending at least one silica according to the invention in water.

This suspension may also be directly derived from the method for preparing the silica according to the invention, in particular before the drying step. It may in particular be constituted of a filtration cake which is derived from the reaction of precipitation of the silica according to the invention and is disintegrated;

in other words, the silica is precipitated, the slurry obtained is filtered, a filtration cake is obtained and is washed if necessary, and said cake is subsequently The aqueous suspension of precipitated silica can be treated by wet milling and/or, optionally, stabilized/protected with a biocide.

It may, for example, have a silica content of between 5 and 50% by weight.

Another subject of the invention comprises a method for preparing a precipitated silica, in particular a silica in accordance with the invention, comprising the reaction of a silicate with an acidifying agent, as a result of which a suspension of precipitated silica is obtained, and then the separation and the drying of this suspension, characterized in that the reaction of the silicate with the acidifying agent is carried out according to the following successive steps:
- (i) an initial stock comprising a part of the total amount of the silicate used in the reaction is formed (in particular by mixing water and silicate), the concentration of silicate (expressed as $SiO_2$) in said initial stock being between 10 and 50 g/l, preferably between 12 and 48 g/l, and the temperature of said initial stock being between 40 and 65° C., in particular between 45 and 55° C.,
- (i') optionally, acidifying agent is added to said stock for 5 to 30 minutes, in particular for 10 to 20 minutes, until a reaction medium pH value of between 3.5 and 8.5 is obtained,
- (ii) acidifying agent and the remaining amount of the silicate are added to said stock simultaneously, for 20 to 150 minutes, in particular for 30 to 120 minutes, for example between 70 and 120 minutes, the ratio of the amount of silicate added (expressed as $SiO_2$)/amount of silicate present in the initial stock (expressed as $SiO_2$) being greater than 5:
  - a) either at constant flow rates resulting, at the end of this simultaneous addition, in a reaction medium pH value of between 3.5 and 8.5,
  - b) or at a flow rate of acidifying agent adjusted so as to maintain the pH of the reaction medium at a value which is constant and between 3.5 and 8.5,
- (iii) in the case where the reaction medium pH value at the end of step (ii) is greater than 6.0, acidifying agent is added to the reaction medium for 3 to 25 minutes, so as to attain a reaction medium pH value of between 3.5 and 6.0,
- (iv) the reaction medium obtained at the end of the preceding step is kept stirring for 5 to 60 minutes, for example for 6 to 20 minutes (ageing step).

It has thus been found that the succession of particular steps constitute important conditions for conferring, on the products obtained, their particular characteristics and properties, especially in a use in the paper industry, in particular as a paper filler, more specifically as a coating filler, for example in a coating slip, for paper, such as paper for inkjet printers (black and/or color), especially color inkjet printers.

As acidifying agent, use is generally made of a strong inorganic acid such as sulfuric acid, nitric acid or hydrochloric acid, or an organic acid such as acetic acid, formic acid or carbonic acid.

The acidifying agent may be diluted or concentrated; its normality may be between 0.4 and 36 N, for example between 0.6 and 1.5 N.

In particular, in the case where the acidifying agent is sulfuric acid, the concentration thereof may be between 40 and 180 g/l, for example between 60 and 150 g/l.

It is, moreover, possible to use, as silicate, silicates of any common form, such as metasilicates, disilicates and advantageously an alkali metal silicate, in particular sodium silicate or potassium silicate.

The silicate may have a concentration (expressed as $SiO_2$) of between 40 and 330 g/l, for example between 60 and 300 g/l, in particular between 60 and 250 g/l.

In general, sulfuric acid is used as acidifying agent and sodium silicate is used as silicate.

In the case where sodium silicate is used, the latter generally has an $SiO_2/Na_2O$ weight ratio of between 2.5 and 4, for example between 3.0 and 3.7.

The same acidifying agent and the same silicate are normally used in the entire method according to the invention.

Preferably, no electrolyte is added in step (i), and more generally, in the method according to the invention.

The term "electrolyte" is herein understood to have its normal meaning, i.e. it means any ionic or molecular substance which, when it is in solution, decomposes or dissociates so as to form ions or charged particles. As electrolyte, mention may be made of a salt of the group of alkali metal or alkaline-earth metal salts, in particular the salt of the metal of the starting silicate and of the acidifying agent, for example sodium chloride in the case of the reaction of a sodium silicate with hydrochloric acid, or preferably sodium sulfate in the case of the reaction of a sodium silicate with sulfuric acid.

The concentration of silicate (expressed as $SiO_2$) in said initial stock (step (i)) is preferably between 15 and 45 g/l, in particular between 20 and 45 g/l, especially between 25 and 45 g/l. It is, for example, between 25 and 40 g/l.

Preferably, the simultaneous addition in step (ii) is such that the degree of consolidation, i.e. the ratio of amount of silicate added (expressed as $SiO_2$)/amount of silicate present in the initial stock (expressed as $SiO_2$), is at least 6, in particular greater than 8, for example greater than 10, or even than 15.

This degree of consolidation is generally at most 30, in particular at most 20, or even at most 16.

In addition to step (i), each of the other steps of the reaction of the silicate with the acidifying agent (optional step (i'), steps (ii), (iii) and (iv)) is, in general, carried out at a reaction medium temperature of between 40 and 65° C., in particular between 45 and 55° C.

According to one variant of the invention, the entire reaction of the silicate with the acidifying agent is carried out at a constant temperature, of between 40 and 65° C., in particular between 45 and 55° C.

Similarly, the entire reaction of the silicate with the acidifying agent is, in general, carried out with stirring of the reaction medium. Preferably, the stirring is then rather vigorous and may correspond to a specific power of at least 1.5 $KW/m^3$, in particular of at least 2 $KW/m^3$ (energy transferred, by means of the stirring, to 1 $m^3$ of reaction medium).

The reaction chamber in which the entire reaction of the silicate with the acidifying agent is carried out is usually equipped with an appropriate stirring device and an appropriate heating device.

At the end of the steps which have just been described, a suspension (or slurry) of silica is obtained, and is subsequently separated (liquid-solid separation).

The separation used in the method of preparation according to the invention usually comprises filtration, followed by washing if necessary. The filtration is carried out according to any suitable method, for example by means of a vacuum filter, a filter press, a belt filter, etc.

The suspension of silica thus recovered (filtration cake) is subsequently dried.

Preferably, the drying is carried out by atomization. To this effect, any suitable type of atomizer may be used, in particular a turbine atomizer, a nozzle atomizer, a liquid-pressure atomizer or a two-fluid atomizer. In general, when the filtration is carried out by means of a filter press, a nozzle atomizer is used, and when the filtration is carried out by means of a vacuum filter, a turbine atomizer is used.

It should be noted that the filtration cake is not always under conditions which allow a pumping to the atomizer and then atomization, in particular because of its high viscosity. In a manner known per se, the cake is then subjected to a disintegration operation, prior to the atomization. This fluidizing operation may here be carried out mechanically, with or without the addition of water, for example by passing the cake through a "ball" type mill, in the presence, or preferably in the absence, of an aluminum compound, or both mechanically and chemically with the addition of an acid, in particular a carboxylic acid. A carboxylic acid can be mixed with or added to the filtration cake before or during the disintegration operation. When a carboxylic acid is used, the latter may be chosen from maleic acid, formic acid, acetic acid, octanoic acid, oxalic acid, propionic acid and succinic acid. The disintegration operation makes it possible in particular to reduce the viscosity of the suspension to be subsequently atomized.

The dried silica (in particular dried with a turbine atomizer) may optionally be subjected to an agglomeration step, for example by direct compression, extrusion or, preferably, dry compacting. When the latter technique is used, it can prove to be advantageous, before carrying out the compacting, to deaerate (operation also referred to as predensifying or degassing) the pulverulent products so as to remove the air included in the latter and to ensure more uniform compacting. The silica that can then be obtained by means of this agglomeration step is generally in the form of granules.

Preferably, in particular for use of the silica obtained as coating filler, for example in a coating slip, for paper, such as paper for inkjet printers, in particular color inkjet printers, the precipitated silica derived from the drying step, and then optionally agglomerated, is subsequently micronized or preferably milled.

The micronization can be carried out with a micronizer, such as an optionally fluidized, air-jet mill.

The milling may be carried out in particular using a mechanical mill, for example of the Forplex ACM type, especially a classifier hammer mill.

The present invention also relates to the precipitated silica that can be obtained by means of the method according to the invention and to an aqueous suspension comprising at least one such silica.

The applicant has noted that the precipitated silicas according to the invention or that can be obtained by means of the method according to the invention, and also the aqueous suspensions containing them (and having, for example, a silica content of between 5 and 50% by weight), can find a very advantageous application in the paper industry, in particular as filler for paper, more specifically as coating filler, for example in a coating slip, for paper such as paper for inkjet printers (in particular black and/or color), especially color inkjet printers. This is more especially the case when the precipitated silica has a median particle size (d50) of at most 20 μm, preferably of between 0.5 and 20 μm, in particular between 2 and 15 μm, especially between 3.5 and 12 μm, for example between 6 and 10.5 μm, or even between 9.5 and 10.5 μm.

They make it possible in particular, advantageously, when a coating slip formulation for paper for inkjet printers is used, to obtain low dust generation or no dust generation at all on the coated paper, rapid drying of the coated paper during and after printing, and very good optical density and precision of the printing.

The amount of silica according to the invention or that can be prepared by means of the method according to the invention, that can be used for the coating of the paper, may, for example, be between 1.5 and 25% by weight, relative to the weight of the uncoated paper, this being as a function of the grammage of the uncoated paper.

The invention also relates to a coating slip for paper, in particular for paper for inkjet printers (especially black and/or color), characterized in that it comprises a silica or a suspension according to the invention.

In general, the coating slip comprises, in addition to the silica (or suspension of silica), at least one polyvinyl alcohol (and/or a starch derivative, a cellulose derivative, a latex) and at least one cationic fixative (for example a polyDADMAC, a methylolamide).

The invention also relates to a method for improving the printing qualities of paper, characterized in that it uses, as filler for paper, a silica according to the invention or that can be obtained by means of the method according to the invention, or a suspension of silica according to the invention.

The silicas according to the invention or that can be obtained by means of the method according to the invention may also be used in other applications, for example:
- as a coating filler for thermal paper,
- as a filler in the bulk of the paper (paper pulp),
- as a liquid support (for example used in animal feed, such as acids (lactic acid especially), pigments, flavorings, vitamins (vitamin E especially), choline chloride), or as a solid support, in particular a catalyst support,
- as an absorbing agent and/or odor masker, in particular in cat litter,
- as a desiccating agent,
- as an additive for inks,
- as a beer and wine clarifier and/or stabilizer,
- as an anti-caking agent, matting agent, additive for paint, antiblocking agent (for example PETP film) and anti-slip agent,
- for chromatography,
- for the adsorption of liquid or of gas (especially in cigarette filters), in particular for the selective adsorption of liquid or gaseous components,
- for the preparation of battery separators (polyethylene or rubber); for the gelling of sulfuric acid (rheological agent, thickener).

The following examples illustrate the invention without, however, limiting the scope thereof.

EXAMPLE 1

The following are introduced into an 80-liter reactor equipped with a stirring and heating system:
- 3.5 kg of sodium silicate with a density equal to 1.23 kg/l and an $SiO_2/Na_2O$ weight ratio equal to 3.47, and
- 18 liters of water.

The concentration of silicate (expressed as $SiO_2$) in the initial stock is 32 g/l.

The solution obtained is brought, with stirring, to 50° C., the temperature at which the entire reaction is carried out. Dilute sulfuric acid (density: 1.05 kg/l) is subsequently introduced for 14 minutes at a flow rate of 305 g/min. Sodium silicate, as described above, at a flow rate of 240 g/min and dilute sulfuric acid (density: 1.05 kg/l) at a flow rate adjusted so as to have a pH equal to 4.0+/−0.1 are then simultaneously introduced for 100 minutes (degree of consolidation at the end of this simultaneous addition: 6.9). The introduction of acid and silicate is subsequently stopped, and the reaction medium is kept stirring for 10 minutes. The reaction slurry is filtered under vacuum, and the cake obtained is washed. The resulting cake is fluidized by mechanical action and dried by atomization (turbine atomizer).

The dried silica is subsequently micronized (by means of a JET PULVERIZER micronizer).

The precipitated silica obtained (S1) is in powder form and has the following characteristics:

| | |
|---|---|
| uptake of DOP oil | 202 ml/100 g |
| porous volume ($V_{d25}$) | 1.02 ml/g |
| CTAB specific surface area | 383 m$^2$/g |
| BET specific surface area | 872 m$^2$/g |
| pore diameter ($d_p$) | 5.0 nm |
| median particle size (d50) | 7.9 μm |
| pH | 4.1 |
| humidity | 7.0% |
| content of soluble salt ($Na_2SO_4$) | 0.9% |

EXAMPLE 2

The following are introduced into an 80-liter reactor equipped with a stirring and heating system:
- 3.5 kg of sodium silicate with a density equal to 1.23 kg/l and an $SiO_2/Na_2O$ weight ratio equal to 3.47, and
- 18 liters of water.

The concentration of silicate (expressed as $SiO_2$) in the initial stock is 32 g/l.

The solution obtained is brought, with stirring, to 50° C., the temperature at which the entire reaction is carried out. Dilute sulfuric acid (density: 1.05 kg/l) is subsequently introduced for 65 minutes at a flow rate of 240 g/min. Dilute sulfuric acid (density: 1.05 kg/l) at a flow rate of 165 g/min and sodium silicate, as described above, at a flow rate of 240 g/min are then simultaneously introduced for 100 minutes (degree of consolidation at the end of this simultaneous addition: 6.9). The introduction of silicate is subsequently stopped and the introduction of acid is continued for 5 minutes at a flow rate of 240 g/min. The reaction medium is subsequently kept stirring for 10 minutes. The reaction slurry is filtered under vacuum, and the cake obtained is washed. The resulting cake is fluidized by mechanical action and dried by atomization (turbine atomizer).

The precipitated silica obtained (S2) is in powder form and has the following characteristics:

| | |
|---|---|
| uptake of DOP oil | 189 ml/100 g |
| porous volume ($V_{d25}$) | 1.07 ml/g |
| CTAB specific surface area | 371 m$^2$/g |
| BET specific surface area | 513 m$^2$/g |
| pore diameter ($d_p$) | 10.6 nm |
| median particle size (d50) | 27.8 μm |
| pH | 2.9 |
| humidity | 11.1% |
| content of soluble salt ($Na_2SO_4$) | 3.3% |

EXAMPLE 3

The following are introduced into a 2000-liter reactor equipped with a stirring and heating system:
- 80 liters of sodium silicate with a density of 1.23 kg/l and an $SiO_2/Na_2O$ weight ratio equal to 3.47, and 525 liters of water.

The concentration of silicate (expressed as $SiO_2$) in the reactor is then 40 g/l.

The solution obtained is brought, with stirring, to 50° C., the temperature at which the entire reaction is carried out. The stirring is vigorous and corresponds to a specific energy of 2.5 KW/m³. Dilute sulfuric acid (density: 1.05 kg/l) is subsequently introduced for 16 minutes at a flow rate of 305 g/min. 100 liters of water are subsequently added to the reaction medium. Sodium silicate, as described above, at a flow rate of 320 l/h, and dilute sulfuric acid (density: 1.05 kg/l) at a flow rate adjusted so as to have a pH equal to 5.5+/−0.1, are then simultaneously introduced for 85 minutes. The introduction of acid and silicate is subsequently stopped and the reaction medium is kept stirring for 5 minutes. The reaction slurry is filtered through a filter press. The resulting cake is fluidized by chemical action using formic acid (formic acid/silica ratio by weight of 0.66%) and dried by atomization (nozzle atomizer).

The dried silica is subsequently micronized (by means of a JET PULVERIZER micronizer).

The precipitated silica obtained (S3) is in powder form and has the following characteristics:

| | |
|---|---|
| uptake of DOP oil | 205 ml/100 g |
| porous volume ($V_{d25}$) | 1.0 ml/g |
| CTAB specific surface area | 360 m²/g |
| BET specific surface area | 707 m²/g |
| pore diameter ($d_p$) | 6.4 nm |
| median particle size (d50) | 10 μm |
| pH | 5.7 |
| humidity | 10.0% |
| content of soluble salt ($Na_2SO_4$) | 0.7% |

EXAMPLE 4

Formulation of the Coating Slip

The powder of precipitated silica obtained in example 1 (S1) is used for the preparation of the aqueous formulation (coating slip) for inkjet printing below:

| Constituents | | Parts by weight |
|---|---|---|
| Precipitated silica | S1 | 100 |
| Polyvinyl alcohol PVA | Mowiol 26/88 (*) | 50 |
| Cationic fixative | Cartafix VXU (**) | 4 |

(*) sold by Kuraray
(**) sold by Clariant

The preparation of the coating slip comprises the following steps:

Preparation of an aqueous suspension of precipitated silica

An aqueous suspension of precipitated silica is first prepared with stirring. The suspension obtained is fluid at ambient temperature and has the following characteristics:

| | |
|---|---|
| dry extract | 21.9% by weight |
| pH | 4.4 |

The measurement of the dry extract is carried out by determining the difference in weight after the medium has been brought to 150° C. and a constant weight has been obtained.

Addition of the polyvinyl alcohol

The polyvinyl alcohol is first dissolved in water; for this, the temperature of the solution is brought to 90° C. and said solution is kept at this temperature for 30 minutes with stirring. The solution is subsequently cooled and stored at 60° C., and is then added to the aqueous suspension of precipitated silica. The mixture obtained has, at ambient temperature, the following characteristics:

| | |
|---|---|
| viscosity | 472 mPa · s |
| dry extract | 17.9% by weight |
| pH | 4.9 |

The viscosity is determined using a Brookfield DV1+ viscometer. For the measurement, the temperature of the medium is thermostatted at 20° C. (+/−1° C.); spindle 3 is used and a speed of 100 rpm is applied.

The measurement of the dry extract is carried out under the same conditions as above.

Addition of the cationic fixative

The cationic fixative is finally added.

The formulation has, at ambient temperature, the following characteristics:

| | |
|---|---|
| viscosity | 490 mPa · s |
| dry extract | 18% by weight |
| pH | 4.8 |

The dry extract and viscosity measurements are carried out under the same conditions as above.

Coating

The paper used is standard Clairefontaine 160 g/m² A4 format paper.

The paper is placed on a base 24 cm×38 cm in size. The coating slip is spread over the sheet manually using a threaded Meyer bar No. 6. The sheet is weighed before and after coating. The sheet is subsequently dried using a hot-air blower.

The weight of coat determined by means of the weighings of the sheets before and after drying and of the dry extract of the formulation is 10.9 m²/g.

Inkjet Printing

The printer used is the Epson Stylus Photo R321. The "text and image" quality and "photo quality coated paper" type parameterization is selected in order to carry out the printing.

Evaluation of the Printed Sheets

Dusting

The coated paper obtained does not exhibit any dusting when it is handled or when it passes through the printer.

Drying

During and after inkjet printing, the drying of the coated sheet is rapid because the ink is rapidly absorbed therein.

Optical density

The optical density is measured using the Gretag MacBeth D19C densitometer. The reference for the white is realized by taking the white of the coated paper. The measurements for the colors cyan, magenta, yellow and black are taken:

| | |
|---|---|
| optical density cyan | 0.61 |
| optical density magenta | 0.92 |
| optical density yellow | 1.04 |
| optical density black | 2.06 |

Precision

The precision of the printing obtained is determined by evaluating the spreading of the ink on the paper. For this, a black rectangle is printed, with an unprinted white surface being left inside said rectangle. This unprinted surface is made up of the numeral 2 from Arial font; it is 0.5 mm high. The readability of the numeral 2 thus defined is evaluated with the eye according to the following classification:

A the numeral 2 appears very clearly,
B the numeral 2 appears clearly,
C the numeral 2 does not appear very clearly,
D the numeral 2 does not appear clearly.

The result obtained for the sheet coated under the conditions defined above is B.

The invention claimed is:

1. A precipitated silica having:
    an uptake of DOP oil of greater than 180 ml/100 g and less than 260 ml/100 g,
    a pore volume ($V_{d25}$) determined by the BJH method, formed by pores with a diameter of less than 25 nm, of greater than 0.8 ml/g,
    a CTAB specific surface area of greater than 300 m$^2$/g,
    a BET specific surface area of greater than 450 m$^2$/g, and
    a median particle size of between 6 and 10.5 μm:
    wherein the precipitated silica is produced by a reaction of an alkali metal silicate and an acidifying agent.

2. The precipitated silica as defined by claim 1, having an uptake of DOP oil of less than 240 ml/100 g.

3. The precipitated silica as defined by claim 1, having a pore volume ($V_{d25}$), formed by pores having a diameter of less than 25 nm, of greater than 0.9 ml/g.

4. The precipitated silica as defined by claim 1, having a pore diameter ($d_p$) for pores with a diameter of less than 25 nm, taken at the maximum of the distribution of pore size by volume, of less than 12.0 nm.

5. The precipitated silica as defined by claim 1, having an aluminum content of less than 2,800 ppm.

6. The precipitated silica as defined by claim 1, having:
    an uptake of DOP oil of less than 205 ml/100 g,
    a pore volume ($V_{d25}$), formed by pores having a diameter of less than 25 nm, of at least 0.95 ml/g,
    a CTAB specific surface area ranging from 330 to 400 m$^2$/g,
    a BET specific surface area of greater than 510 m$^2$/g, and
    a pore diameter ($d_p$), for pores with a diameter of less than 25 nm, taken at the maximum of the distribution of pore size by volume, of less than 12.0 nm.

7. An aqueous suspension of precipitated silica, which comprises at least one precipitated silica as defined by claim 6.

8. A method for preparing a precipitated silica as defined by claim 1, said method comprising reacting a silicate with an acidifying agent to obtain a suspension of precipitated silica and then separating and drying this suspension, wherein the reaction of the silicate with the acidifying agent comprises the following successive steps:
    (i) forming an initial stock comprising a part of the total amount of the silicate employed in the reaction, the concentration of silicate (expressed as SiO$_2$) in said initial stock ranging from 10 to 50 g/l, and the temperature of said initial stock ranging from 40 to 65° C.,
    (ii) adding acidifying agent and the remaining amount of the silicate to said stock simultaneously, for 20 to 150 minutes, the ratio of the amount of silicate added (expressed as SiO$_2$) / amount of silicate present in the initial stock (expressed as SiO$_2$) being greater than 5:
        a) either at constant flow rates resulting, upon completion of such simultaneous addition, in a reaction medium pH value ranging from 3.5 to 8.5,
        b) or at a flow rate of acidifying agent adjusted such as to maintain the reaction medium pH at a value which is constant and ranges from 3.5 to 8.5,
    (iii) in the event that the reaction medium pH value at the end of step (ii) is greater than 6.0, adding acidifying agent to the reaction medium for 3 to 25 minutes, to provide a reaction medium pH value ranging from 3.5 to 6.0, and
    (iv) maintaining the reaction medium obtained at the end of the preceding step stirred for 5 to 60 minutes.

9. The method as defined by claim 8, which further comprises, between step (i) and step (ii), the following step (i'):
    (i') adding acidifying agent to said stock for 5 to 30 minutes, until a reaction medium pH value ranging from 3.5 to 8.5 is obtained.

10. The method as defined by claim 8, wherein the concentration of silicate (expressed as SiO$_2$) in said initial stock ranges from 15 to 45 g/l.

11. The method as defined by claim 8, wherein no electrolyte is added in step (i).

12. The method as defined by claim 8, wherein separating the suspension comprises filtration, followed by disintegration of the filtration cake obtained at the end of the filtration, wherein a carboxylic acid is mixed with or added to said cake before or during the disintegration operation.

13. The method as defined by claim 8, wherein the precipitated silica obtained at the end of the drying step is milled or micronized.

14. An aqueous suspension of precipitated silica, which comprises at least one precipitated silica as defined by claim 1.

15. A filler or coating for paper, comprising a suspension of precipitated silica as defined by claim 1.

16. A coating slip for paper for inkjet printers, which comprises a precipitated silica as defined by claim 1.

17. A method for improving the printing qualities of paper, which comprises including as filler material for such paper, a precipitated silica as defined by claim 1.

18. A coating filler for thermal paper, a filler for the bulk of the paper, a liquid support, a solid support, optionally a catalyst support, an absorbing agent and/or odor masker, a desiccating agent, an additive for inks, a beer or wine clarifier and/or stabilizer, an anti-caking agent, a matting agent, an additive for paint, an anti-blocking agent or an anti-slip agent, for chromatography, for the adsorption of liquid or of gas, optionally in cigarette filters, a battery separator or a gelling agent for sulfuric acid, comprising the precipitated silica as defined by claim 1.

19. The precipitated silica as defined by claim 1, having a CTAB specific surface area of greater than 350 m$^2$/g.

20. The precipitated silica as defined by claim 1, having a BET specific surface area of greater than 540 m$^2$/g.

21. The precipitated silica as defined by claim 5, having an aluminum content of less than 200 ppm.

22. The precipitated silica as defined by claim 5, having a pH of between 2.5 and 6.0, wherein the pH is measured according to standard ISO 787/9.

* * * * *